United States Patent [19]

Burgman et al.

[11] 3,892,581

[45] July 1, 1975

[54] GLASS FIBER COMPOSITIONS

[75] Inventors: Jerome A. Burgman, Murrysville; Edward M. Hunia, Pittsburgh; Homer E. Neely, Jr., Tarentum, all of Pa.

[73] Assignee: PPG Industries, Inc., Pittsburgh, Pa.

[22] Filed: Sept. 10, 1973

[21] Appl. No.: 395,791

[52] U.S. Cl. .................. 106/50; 106/52; 106/54; 260/37 R
[51] Int. Cl. .............................................. C03c 3/12
[58] Field of Search ................... 106/50, 52, 54; 161/DIG. 4

[56] References Cited
UNITED STATES PATENTS

| | | | |
|---|---|---|---|
| 2,664,359 | 12/1953 | Dingledy | 106/50 |
| 2,805,181 | 9/1957 | Groff et al. | 161/DIG. 4 |
| 3,166,428 | 1/1965 | Thomas | 106/50 |
| 3,183,104 | 5/1965 | Thomas | 106/50 |
| 3,189,471 | 6/1965 | Thomas | 106/50 |
| 3,402,055 | 9/1968 | Harris et al. | 106/50 |
| 3,408,213 | 10/1968 | Provance et al. | 106/50 |
| 3,459,568 | 8/1969 | Rinehart | 106/50 X |

Primary Examiner—Winston A. Douglas
Assistant Examiner—John F. Niebling
Attorney, Agent, or Firm—Robert DeMajistre

[57] ABSTRACT

Glass fibers having high tensile strength containing carefully selected quantities of $SiO_2$, $Al_2O_3$, MgO, CaO, $TiO_2$, $B_2O_3$, $Na_2O$, BaO and $Li_2O$.

9 Claims, No Drawings

GLASS FIBER COMPOSITIONS

BACKGROUND OF THE INVENTION

The present invention relates to glass fiber compositions having increased tensile strengths over conventional "E" glass fibers.

Glasses in order to be suited for glass fiber manufacture must satisfy several criteria.

Since fine glass fibers present a large surface area to volume ratio, compositions resistant to water and chemical attack are necessary. High alkali content is undesirable since water adsorbed from the atmosphere can dissolve the alkali, initiating reaction with the silicate in the glass and ultimately destroying the glass. Therefore, the alkali metal content of glass fiber compositions must be limited.

In the formation of fine glass fibers, it is desirable to have a glass composition which may be melted and refined at high rates at relatively low temperatures. The glass should have a workable viscosity over a wide range of relatively low temperatures. The glass should have a low liquidus temperature and a limited devitrification rate. It is desirable for the color of the glass, as melted, to be such that heat is readily transmitted through the glass.

Of particular importance is the use of glass fibers for reinforcing resinous articles known as laminates. Laminates are formed by impregnating glass fiber cloth, glass fiber chopped strand, or glass fiber mat with a resinous composition. The function of the glass fibers is to reinforce the article and provide a strength far superior to the hardened resin composition alone. In addition, glass fibers have found great utility in the reinforcement of rubber articles such as tires, power transmission belts, and the like. The glass fibers are normally incorporated into these rubber-reinforced articles in cord form to provide additional strength to these elastomeric type articles. Therefore, it is apparent that glass fibers having high tensile strength to impart strength to rubber-reinforced articles are desired.

The most common glass fiber composition used for reinforcement of articles is the "E" glass composition which typically consists of 54.4 percent $SiO_2$, 13.4 percent $Al_2O_3$, 21.7 percent CaO, 0.4 percent MgO, 8.5 percent $B_2O_3$, 0.5 percent $F_2$, 0.7 percent $Na_2O$, 0.5 percent $TiO_2$, and 0.2 percent $Fe_2O_3$.

This "E" glass composition demonstrates tensile strengths of 400,000 to 500,000 pounds per square inch for fibers measuring from $12.5 \times 10^{-5}$ inches to $70 \times 10^{-5}$ inches in diameter.

Other compositions than "E" glass exhibiting high tensile strengths in fibrous form are also known. These glass compositions typically have an extremely high percentage of $SiO_2$, usually greater than 65 percent, and, in addition, have an increased amount of $Al_2O_3$, typically greater than 25 percent. These glass compositions produce fibers which demonstrate tensile strengths on the order of 600,000 pounds per square inch for fibers measuring from $35 \times 10^{-5}$ inches to $64 \times 10^{-5}$ inches in diameter. Tensile strengths arrived at by these glass compositions are very advantageous for reinforcing purposes. However, due to the high amount of $SiO_2$ and $Al_2O_3$ present in these glasses, the liquidus temperatures of these compositions are normally greater than 2,600°F., which substantially reduces the life of refractories and metals used in the melting and forming operations producing these fibers. An example of a high tensile strength glass is disclosed in U.S. Pat. No. 3,402,055. This glass consists of 65 percent $SiO_2$, 25 percent $Al_2O_3$ and 10 percent MgO and exhibits tensile strengths of about 637,000 pounds per square inch. This magnesia-silica-alumina glass will hereinafter be referred to as "S" glass. The liquidus temperature for this glass is between 2,630° and 2,650°F. Glasses with liquidus temperatures such as these require increased melting and processing temperatures over "E" glass, thus having adverse effects on refractory lining in melting tanks and on bushing life.

Therefore, it is still a desire in the art to produce glass fibers useful for reinforcement of articles which have tensile strength greater than "E" glass from a glass composition which has a relatively low liquidus temperature, maximum chemical inertness, maximum heat transfer through the glass, and a limited devitrification rate.

SUMMARY OF THE INVENTION

In accordance with the practice of the instant invention, the aforementioned properties and other properties can be achieved by preparing a glass fiber composition which contains 53 to 57.3 percent by weight as $SiO_2$ 16.3 to 18.5 percent by weight as $Al_2O_3$, 6.6 to 10.5 percent by weight as MgO, 8.5 to 12.7 percent by weight as CaO, 0.6 to 0.8 percent by weight as $TiO_2$, 2.0 to 4.1 percent by weight as $B_2O_3$, 0.8 to 3.3 percent by weight as $Na_2O$, 0.0 to 4.1 percent by weight as BaO and 0.0 to 1.0 percent by weight as $Li_2O$.

The combination of the components at the levels designated impart the necessary properties to the glass fibers formed therefrom.

Other components such as $Fe_2O_3$ may be present due to impurities in the starting glass batch materials. However, $Fe_2O_3$ should be limited to about 0.3 percent maximum, otherwise the glass melt composition may have inadequate heat penetration during processing.

Liquidus temperatures of below 2,210°F. are encountered with the aforementioned range of glass composition. This liquidus temperature is surprisingly low in comparison with the tensile strength achieved by the range of components necessary in the practice of the instant invention. Thus, the life of the refractories, used in the melting and refining process, which contact the glass is greatly increased while an increase in tensile strength of the glass fibers produced over conventional "E" glass is realized.

The invention will be more clearly illustrated by the examples below. However, these examples which describe specific embodiments should not be construed to limit the invention in any way.

EXAMPLE I

The following raw batch materials were weighed out in the amounts indicated to formulate the preferred composition A.

Table 1

| Raw Batch Materials | Weight in Grams |
|---|---|
| Silica | 169.0 |
| Clay | 198.2 |
| Dolomite | 160.0 |
| Magnesium Oxide | 6.9 |
| Boric Acid | 34.5 |
| Soda Ash | 6.4 |
| Barium carbonate | 25.0 |

The raw batch materials were placed in a Twin Shell Blender and thoroughly mixed by rotating the blender for 30 minutes. After mixing, the batch was transferred to a 4-inch diameter silica crucible and inserted in a refractory furnace. The batch was heated to a temperature of about 2,700°F. for a period of 6 hours. After this heating, the molten glass was removed from the furnace and poured onto a steel plate to produce a glass patty approximately ½ inch thick by about 4 inches by 4 inches square. The glass patty was placed in a furnace, preheated to about 1,100°F. The power to the furnace was turned off and the furnace was allowed to cool slowly to room temperature over a period of about 18 hours to anneal the glass. The annealed glass patty was then removed from the annealing furnace and broken into small chunks.

The chunks of glass were then placed in a single orifice — 80 percent platinum, 20 percent rhodium bushing, and remelted and refined by heating the bushing to about 2,800°F. and holding at this temperature for 1 hour. The bushing temperature was then lowered to the fiberizing temperature, 2,450°F., and a single filament was drawn from the bushing approximately $40 \times 10^{-5}$ inches in diameter at a rate of about 1,600 feet per minute.

The single orifice bushing used in fabricating the fiber was 3 inches long by 1⅝ inches square. The bushing single orifice was .047 inch in inside diameter, .080 inch long, and had an exit outside diameter of under .060 inches.

Immediately after the glass fiber made from the above composition was drawn, several 1-inch samples were obtained. The samples were then tension loaded in a monofilament tensile testing machine to determine their tensile breaking load. The tensile strength in pounds per square inch was then calculated by dividing the breaking load in pounds by the cross-sectional area of the fiber in square inches.

Two batches of glass with a composition as above were made. The softening points of these compositions were 1,620°F. and 1,628°F. and had liquidus temperatures of about 2,175°F. The tensile strength of monofilament fibers on testing displayed strengths of between 590,000 to 650,000 pounds per square inch.

EXAMPLE II

The following raw batch materials were weighed out in the amounts indicated to formulate the preferred composition B:

Table 2

| Raw Batch Materials | Weight in Grams |
| --- | --- |
| Silica | 181.5 |
| Clay | 203.3 |
| Dolomite | 137.6 |
| Magnesium Oxide | 2.0 |
| Boric Acid | 28.1 |
| Soda Ash | 27.2 |
| Barium Carbonate | 20.3 |

This batch was melted, refined, annealed, and fibers were drawn therefrom in accordance with the procedure of Example I. This glass batch had a softening point of 1,605°F. to 1,619°F. and a liquidus temperature of between 2,060°F. and 2,108°F. Testing of monofilament fibers formed as above described had tensile strengths between 585,000 pounds per square inch and 630,000 pounds per square inch.

EXAMPLE III

The following raw batch materials were weighed out in the amounts indicated to formulate the composition C:

Table 3

| Raw Batch Materials | Weight in Grams |
| --- | --- |
| Silica | 169.3 |
| Clay | 189.2 |
| Dolomite | 192.8 |
| Magnesium Oxide | 7.7 |
| Boric Acid | 26.2 |
| Soda Ash | 8.5 |
| Barium Carbonate | 6.3 |

The above batch materials were melted, refined, annealed, and fibers were drawn therefrom in accordance with the method of Example I. The glass formed from this batch had a softening point of 1,623°F. to 1,625°F. and the liquidus temperature of between 2,200°F. and 2,208°F. Tensile strengths of the glass fibers drawn from these compositions were between 585,000 pounds per square inch and 650,000 pounds per square inch.

EXAMPLE IV

The following raw batch materials were weighed out in the amounts indicated to formulate the preferred composition D:

Table 4

| Raw Batch Materials | Weight in Grams |
| --- | --- |
| Silica | 147.8 |
| Clay | 184.4 |
| Dolomite | 169.1 |
| Boric Acid | 16.7 |
| Magnesium Oxide | 8.3 |
| Soda Ash | 8.1 |
| Spodumene | 65.5 |

The above ingredients were mixed, melted, annealed, and fibers were drawn therefrom according to the procedure in Example I. Glass made from this batch had a liquidus temperature of 2,170°F. to 2,190°F. and a softening point of 1,560°F. to 1,580°F. Tensile strength of fibers drawn from this glass composition were between 595,000 pounds per square inch to 635,000 pounds per square inch.

EXAMPLE V

The following raw batch materials were weighed out in the amounts indicated to formulate the preferred composition E:

Table 5

| Raw Batch Materials | Weight in Grams |
| --- | --- |
| Silica | 147.6 |

Table 5-Continued

| Raw Batch Materials | Weight in Grams |
|---|---|
| Clay | 223.9 |
| Dolomite | 130.6 |
| Boric Acid | 30.1 |
| Magnesium Oxide | 18.9 |
| Soda Ash | 11.3 |
| Barium Carbonate | 24.2 |

The above materials were mixed, melted, annealed, refined, and fibers were drawn therefrom in accordance wih the procedure of Example I. This glass had a softening point of 1,633°F. and a liquidus temperature of 2,200°F. Fibers drawn from this glass had a tensile strength of between 585,000 pounds per square inch and 620,000 pounds per square inch.

The liquidus temperature determinations for the above specific compositions were made by the conventional 24 hour liquidus technique in which ground glass is placed in a shell or platinum boat, the shell or boat is then placed in a gradient furnace with one end about 1,300°F. and the other about 2,500°F., heated and maintained in equilibrium with the furnace for 24 hours and then removed for microscopic determination of the crystal-glass interface of the sample. Correspondence of the crystal-glass interface with the known lateral position to temperature relation for the furnace establishes the liquidus.

Softening point determination is by the conventional ASTM-C 338-57 method. The glass fiber is prepared and placed in a uniform temperature furnace. Temperature is increased and temperature rise and fiber elongation are recorded. When the elongation rate meets the pre-set standard of the test, the temperature is noted as the softening point.

The foregoing Table represents the properties of the hereinbefore set forth Examples and compares the glasses therewith.

Table 6

| Composition | Softening Point °F. | Liquidus °F. | Tensile Strength PSI × 10³ |
|---|---|---|---|
| A | 1620–1628 | 2175 | 590–650 |
| B | 1605–1619 | 2060–2108 | 585–630 |
| C | 1623–1625 | 2200–2208 | 585–650 |
| D | 1560–1580 | 2170–2190 | 595–635 |
| E | 1633 | 2200 | 585–620 |
| "E" Glass | 1540–1560 | 2170–2190 | 400–500 |
| "S" Glass | | 2630–2650 | 637 |

The improved tensile strengths of the glass fiber compositions herein disclosed permit the production of improved glass reinforced plastic articles and improved glass reinforced rubber articles such as tires and power transmission belts.

It is anticipated that these fiber glass compositions will find particular acceptance in the production of various types of aircraft equipment where high strength to weight ratios are important. Glasses with these improved properties are readily melted and formed in the conventional commercial glass fiber strand-producing facilities. Combination of the various ingredients permits melting and forming at comparable temperatures with "E" glass while providing improved tensile strengths.

While the present invention has been described in terms of specific examples, the scope of the invention should not be limited except as is set forth in the appended claims.

We claim:

1. A glass fiber composition consisting essentially of 53 percent to 57.3 percent by weight as $SiO_2$, 16.3 percent to 18.5 percent by weight as $Al_2O_3$, 6.6 percent to 10.5 percent by weight as MgO, 8.5 percent to 12.7 percent by weight as CaO, 0.6 percent to 0.8 percent by weight as $TiO_2$, 2.0 percent to 4.1 percent by weight as $B_2O_3$, and 0.8 percent to 3.3 percent by weight as $Na_2O$ having a tensile strength of greater than 570,000 pounds per square inch formed from a glass composition having a softening point below 1,650°F. and a liquidus temperature below 2,210°F.

2. The glass fiber of claim 1 having therein 0.1 percent to 4.1 percent by weight as BaO.

3. The glass fiber of claim 2 having therein 0.01 percent to 1.0 percent by weight as $Li_2O$.

4. The glass fiber of claim 1 having therein 0.01 percent to 1 percent by weight as $Li_2O$.

5. A glass fiber composition consisting essentially of 56.6 percent by weight as $SiO_2$, 18.5 percent by weight as $Al_2O_3$, 0.3 percent by weight as $Fe_2O_3$, 9.3 percent by weight as MgO, 10.7 percent by weight as CaO, 0.6 percent by weight as $TiO_2$, 2.0 percent by weight as $B_2O_3$, 1.0 percent by weight as $Na_2O$, and 1.0 percent by weight as $Li_2O$ having a tensile strength of greater than 570,000 pounds per square inch, formed from a glass composition having a softening point below 1650°F. and a liquidus temperature below 2210°F.

6. A glass fiber composition consisting essentially of 57.3 percent by weight as $SiO_2$, 16.5 percent by weight as $Al_2O_3$, 0.2 percent by weight as $Fe_2O_3$, 6.6 percent by weight as MgO, 8.8 percent by weight as CaO, 0.7 percent by weight as $TiO_2$, 3.3 percent by weight as $B_2O_3$, and 3.3 percent by weight as BaO having a tensile strength of greater than 570,000 pounds per square inch formed from a glass composition having a softening point below 1,650°F. and a liquidus temperature below 2,210°F.

7. A glass fiber composition consisting essentially of 54.7 percent by weight as $SiO_2$, 15.8 percent by weight as $Al_2O_3$, 0.2 percent by weight as $Fe_2O_3$, 10.5 percent by weight as MgO, 12.7 percent by weight as CaO, 0.7 percent by weight as $TiO_2$, 3.2 percent by weight as $B_2O_3$, 1.1 percent by weight as $Na_2O$, and 1.1 percent by weight as BaO having a tensile strength greater than 570,000 pounds per square inch formed from a glass composition having a softening point below 1,650°F. and a liquidus temperature below 2,210°F.

8. A glass fiber composition consisting essentially of 54.8 percent by weight as $SiO_2$, 16.3 percent by weight as $Al_2O_3$, 0.2 percent by weight as $Fe_2O_3$, 8.7 percent by weight as MgO, 10.3 percent by weight as CaO, 0.7 percent by weight as $TiO_2$, 4.1 percent by weight as $B_2O_3$, 0.8 percent by weight as $Na_2O$, and 4.1 percent by weight as BaO having a tensile strength greater than 570,000 pounds per square inch formed from a glass composition having a softening point below 1,650°F. and a liquidus temperature below 2,210°F.

9. A glass fiber composition consisting essentially of 53.0 percent by weight as $SiO_2$, 18.5 percent by weight as $Al_2O_3$, 0.2 percent by weight as $Fe_2O_3$, 10.0 percent by weight as MgO, 8.5 percent by weight as CaO, 0.8 percent by weight as $TiO_2$, 3.6 percent by weight as $B_2O_3$, 1.4 percent by weight as $Na_2O$, and 4.0 percent by weight as BaO having a tensile strength of greater than 570,000 pounds per square inch formed from a glass composition having a softening point below 1,650°F. and a liquidus temperature below 2,210°F.

* * * * *